United States Patent [19]
Greenstein

[11] 3,879,130
[45] Apr. 22, 1975

[54] METHOD AND APPARATUS FOR THE OPERATION OF RING LASER IN A BIASED MODE

[76] Inventor: Howard B. Greenstein, P.O. Box 993, Palo Alto, Calif. 94302

[22] Filed: May 16, 1973

[21] Appl. No.: 360,728

[52] U.S. Cl. .......................................... 356/106 LR
[51] Int. Cl. ............................................ G01b 9/02
[58] Field of Search ............................. 356/106 LR

[56] References Cited
UNITED STATES PATENTS

| | | | |
|---|---|---|---|
| 3,627,422 | 12/1971 | Chodorow | 356/106 LR |
| 3,741,657 | 6/1973 | Andringa | 356/106 LR |

OTHER PUBLICATIONS

"Investigation of Power Resonances of a Ring Laser with a Nonlinearly Absorbing Cell", Basov et al.; Soviet Physics OETP; Vol. 33, No. 1, July 1971, pp. 66–69, Primary Examiner—Vincent P. McGraw
Attorney, Agent, or Firm—Townsend and Townsend

[57] ABSTRACT

A method and apparatus is disclosed for the operation of a ring laser in a biased mode. Two separate cavity resonances support the simultaneous oscillations of two counter-circulating traveling waves. In the preferred embodiment the biased mode of operation is realized through the action of a saturable absorber internal to the ring laser cavity. Stabilization may be achieved by monitoring the intensity of one of the two output waves and tuning the cavity in response thereto.

28 Claims, 2 Drawing Figures

METHOD AND APPARATUS FOR THE OPERATION OF RING LASER IN A BIASED MODE

BACKGROUND OF THE INVENTION

This invention relates to ring lasers and more particularly to a method and apparatus for the establishment and utilization of a biased mode of operation of a ring laser instrument.

A principal characteristic of a ring laser, and one by which it may be distinguished from a conventional laser, is the configuration of its cavity. In a conventional laser two highly reflecting end mirrors form a cavity of the Fabry-Perot type, for which the normal modes of oscillation are standing waves. The cavity of a ring laser, on the other hand, is determined by the placement of three or more highly reflecting mirrors, so that the normal modes of oscillation are traveling waves whose paths trace the perimeter of a plane geometrical figure (the "ring"), which in a typical case may be a triangle or a square. The ring laser cavity, unlike the Fabry-Perot cavity, may support two independent counter-circulating traveling wave oscillations corresponding to the two directions of traversal of the ring perimeter.

Ring lasers are of practical importance because of their extreme sensitivity to non-reciprocal effects, whereby optical path length becomes a function of the direction of wave propagation. Examples of phenomena whose effects are non-reciprocal include:

a. A physical rotation of the ring laser cavity about an axis normal to the plane of the ring;

b. Induced optical activity, also known as Faraday effect, whereby a magneto-optic element shows circular bire-fringence in the presence of an applied magnetic field; and c. Fresnel drag, also known as the Fizeau or Fizeau-Fresnel effect, whereby the phase velocity of a wave propagating in a moving medium is increased or decreased according as the wave and the medium are moving in the same or in opposite directions.

In the absence of such effects a single cavity resonance may support the simultaneous oscillations of two counter-circulating traveling waves that experience the same round-trip optical path lengths and that are therefore identical in frequency. The introduction of non-reciprocal effects leads to inequality of the two optical path lengths, with the consequence that the two waves oscillate with different frequencies.

Under ideal circumstances a ring laser instrument may be operated on the principle that the separation in frequency between the two counter-circulating traveling waves is a measure of the nonreciprocity that was introduced. In this way an ideal ring laser instrument may, for example, serve as a rotation sensor; the induced difference in frequency $\Delta f$ for a ring of perimeter p enclosing an area A, the laser operating at a wavelength $\lambda$, is simply $$\Delta f = \frac{4A}{\lambda p} \Omega \qquad (1)$$

where $\Omega$ is the component of rotation rate in the plane of the ring. In this application it is the rotational motion that is responsible for an optical path length difference between the counter-circulating traveling waves.

A problem with all present ring lasers is that their actual behavior is not ideal in the sense described above, in that for differences of optical path length less than some critical value the frequencies of the two counter-circulating traveling waves remain locked to each other. For optical path length differences greater than the critical value, the induced difference in frequency depends in a non-linear fashion on the optical path length difference, the relationship approaching an ideal, linear one only in the asymptotic limit. Thus, in the case of the ring laser rotation sensor the observed behavior is not the one shown above in Eq. (1), but is rather $$\Delta f = \begin{cases} 0, & \Omega^2 \leq \Omega_c^2 \\ \frac{4A}{\lambda p}\sqrt{\Omega^2 - \Omega_c^2}, & \Omega^2 > \Omega_c^2 \end{cases} \qquad (2)$$

where $\Omega_c$ is some critical rotation rate. The phenomenon of frequency locking is associated with coupling between the supposedly independent counter-circulating waves. A mechanism for coupling may be small amounts of backscattering due to minor imperfections at any of the optical surfaces.

Since it has not been found possible to reduce the locking threshold to zero, the solution to the locking problem that is usually adopted is to impose a bias, so that the counter-circulating traveling waves oscillate with different frequencies even in the absence of an input. In this situation the optical path length difference is regarded as consisting of two parts: (1) a fixed part, not associated with the quantity to be measured, that gives rise to a highly stable difference in frequency that serves as the quiescent operating point in the absence of an input, and (2) additional applied differences in optical path length that are associated with the quantity to be measured, and whose effect is to alter the frequency difference away from the quiescent bias value. With this technique it is desirable that the optical path length difference providing the bias be very much larger than the critical optical path length difference associated with the locking, since in this limit the relationship between applied optical path length difference and change in frequency separation, relative to the bias value, will become a nearly linear one.

Just as a ring laser instrument may serve to detect and/or measure certain non-reciprocal phenomena, such as rotation, Faraday effect and Fresnel drag, in the same way effects of this type have been utilized for the purpose of providing the bias. The success of any biasing scheme depends critically on the bias stability, since fluctuations in the bias are indistinguishable from a real input. All of the present biasing techniques suffer from the disadvantage that the desired stability is very difficult to achieve.

In the mechanical methods, as exemplified by U.S. Pat. No. 3,373,650, a bias is imposed either by means of a rotation at a constant angular rate or, more usually, in order to obtain greater stability, by repetitively switching the rotational sense between clockwise and counter-clockwise (the so-called "mechanical dithering" technique). The mechanical schemes however involve a considerable degree of complexity, and, more seriously, they reintroduce basic mechanical limitations that can hopefully be avoided in a purely opto-electronic ring laser type of instrument.

Probably the most common biasing technique utilizes a Faraday cell, as exemplified once again by U.S. Pat. No. 3,373,650, wherein a longitudinal magnetic field is applied to a magneto-optic element that is surrounded by two quarter-wave plates having their fast and slow axes orthogonally aligned. An incident traveling wave linearly polarized in a direction making an angle of 45° with the axes of one of the quarter-wave plates is then converted to a circularly polarized wave and propagates as such through the Faraday cell before its polarization is reconverted to linear by the second quarter-wave plate. However, the two counter-circulating waves propagate in the Faraday cell in one case as right circularly polarized and in the other case as left circularly polarized; since the applied magnetic field induces a difference in refractive index for these two polarization states, the two waves encounter different optical path lengths, with the result that their oscillation frequencies are also different. A problem with the Faraday cell technique is that the substantial solenoid currents required to obtain a sufficiently large bias are not easily stabilized to the desired degree. The stability problem is further complicated by the temperature dependence of the Verdet constant of the magneto-optic element and by the effects of stray magnetic fields, which must be shielded against. In addition, the Faraday cell is difficult to align, and because it involves a number of optical surfaces, it causes an undesirable increase in the locking threshold. As a result, a Faraday biased ring laser is expensive, complex and bulky, and it also consumes a considerable amount of power.

A third bias technique is to utilize the Fresnel drag effects that are associated with flowing media, as discussed by W. M. Macek, et al. in a 1964 article appearing on Page 2556 of Volume 35 of the Journal of Applied Physics. However, the stability and linearity achievable with this technique, which is again a mechanical one, make it inferior to the other two. In short then, with respect to the requirements relating to stability, simplicity, cost, size, weight and flexibility of design, none of the present methods for biasing can be regarded as satisfactory.

A primary object then of the present invention is to provide a technique for the biasing of a ring laser that is superior to currently used techniques on the basis of performance, cost, simplicity, and other factors such as will become evident from a consideration of the detailed descriptions of this invention.

In its most general aspect the present disclosure describes the operation of a ring laser whereby a bias is effectively imposed without resort to any of the customary non-reciprocal techniques. Operation of this type is possible if two counter-circulating traveling waves can be established on two separate cavity resonances (alternatively referred to as cavity modes). In particular, a first cavity resonance supports a first traveling wave oscillation having a first circulatory propagation sense and a particular oscillation frequency and a second cavity resonance supports a second traveling wave oscillation having a second and contrary circulatory propagation sense and a different oscillation frequency, the difference in frequencies in the absence of any input being equal to the bias frequency. In a typical case the two cavity modes in question will be $TEM_{00q}$ modes whose axial mode numbers q differ by unity. The present technique for biasing, in that it utilizes two distinct cavity resonances and does not require the application of non-reciprocal effects, is thereby differentiated from the various biasing methods that comprise the prior art, wherein a non-reciprocal effect induces a difference in frequency between two counter-circulating traveling waves whose oscillations are associated with a single cavity resonance.

With reference to the present invention in its preferred embodiment, which involves a saturable absorber, as described in detail below, numerous other very desirable features of operation are realizable. A primary one is the suppression of the two further independent oscillations that could possibly be supported by the same two cavity resonances. In particular, it is desired that there be no traveling wave oscillation on the said first cavity resonance having the said second circulatory propagation sense, and no traveling wave oscillation on the said second cavity resonance having the said first circulatory propagation sense. If these potential oscillations are not suppressed, there will exist the situation wherein a single cavity resonance is supporting two counter-circulating traveling wave oscillations, with the result that the individual oscillation frequencies become subject to the same locking effects that necessitated the application of a bias in the first place.

A further feature of the present invention is the provision of a discriminant signal derivable directly from one of the outputs of the ring laser, thereby permitting an exceptionally high degree of stabilization of (a) the two individual oscillation frequencies and hence (b) the difference between the two said frequencies. As a consequence the bias frequency is effectively stabilized to the same high degree. Stabilization of the individual oscillation frequencies has the further desirable effect of minimizing errors associated with the frequency dependence of the shifts induced by atomic line pulling. In conventional biasing schemes these frequency variations are a major source of error, and adequate control is achieved only by temperature stabilization of the entire ring laser cavity.

Still further advantageous features of operation are concurrently realizable. One of these in the suppression of oscillations on all cavity resonances other than the two involved in the biased mode operation described above. If these oscillations are not suppressed, they induce additional frequency shift effects that vary with mode intensity, thereby degrading the bias stability. In conventional biasing schemes mode suppression is usually accomplished by operating in a "near threshold" condition, wherein the gain is slightly above threshold for one cavity resonance, but below threshold for all other resonances. However, with this type of operation the output is limited to low power levels. No limitation of this kind exists in the present biasing scheme, where the desired mode suppression may be achieved as a concomitant feature of operation.

Another source of error that must be contended with in conventional biasing schemes but that is negligible in the present one concerns the mutual frequency shifts induced by one traveling wave on the counter-circulating wave. Mutual frequency shift effects are in general present between any two oscillations that are supported by different groups of atoms or molecules comprising the gain or absorption media. However, in the biased mode of operation characterizing the present invention in its preferred embodiment, only a single group of atoms or molecules participates, as described in further detail below, so that the mutual frequency shifts are negligible.

A further and significant advantage associated with the present technique derives from the fact that typical bias frequencies are very high. For example, in a ring laser whose cavity perimeter is 300 centimeters, the axial mode spacing will be 100 MHz, so that the bias frequency will be approximately 100 MHz if adjacent cavity resonances are selected. This is much higher, by several orders of magnitude, than bias frequencies generally achievable with prior art techniques. It is also sufficiently large to make the non-linearities associated with locking totally negligible. However, this latter point becomes somewhat academic if, as will often be the case, the separation in frequency between the two counter-circulating traveling waves greatly exceeds the cavity resonance linewidth (a few MHz, typically), so that coupling through backscattering, which is generally regarded as the major effect giving rise to frequency locking, is virtually eliminated.

BRIEF SUMMARY OF THE INVENTION

The general method disclosed in this specification is for the biased mode operation of a ring laser instrument wherein two separate cavity resonances support the oscillations of two counter-circulating traveling waves, their difference in frequency being non-zero even in the absence of non-reciprocal effects. The preferred embodiment whereby such operation may be achieved involves a saturable absorber internally disposed within the ring laser cavity. The desired two-frequency contra-directional oscillation state may be established if two cavity resonances have been tuned such that they are symmetrically disposed with respect to the center frequency of the predominantly inhomogeneously broadened absorption line. Stabilization of the two frequencies that have thereby been established is achieved by means of a servo whose input is obtained by monitoring the output intensity of one of the two counter-circulating traveling waves. A servo output signal is obtainable on the basis of the variation of the output intensity of either traveling wave with changes in the cavity tuning, this variation showing a stationary behavior, i.e., a local maximum or minimum, when the cavity tuning is such that the two oscillation frequencies obey the above mentioned symmetry relation. Since the linewidth associated with these intensity variations is comparable with the homogeneous absorption width, which, for low absorption gas pressures, is very narrow, the servo can provide a high degree of stabilization for the two oscillation frequencies with respect to the absorption line center and hence also with respect to each other.

There follows below a more detailed description of this invention which, when taken in conjunction with the accompanying drawings and claims, will further show how the various objects and features of the invention are realized and will at the same time illustrate numerous other advantages.

DETAILED DESCRIPTION OF THE INVENTION

The present invention relates to a method and apparatus for establishing and utilizing a biased mode of operation of a ring laser instrument. Said mode of operation is characterized by the simultaneous oscillation of two traveling wave modes having contrary circulatory senses of propagation and a well defined difference between their oscillation frequencies. In the absence of an input, the said difference between oscillation frequencies represents the bias; this condition defines the quiescent operating point for the ring laser. Application of any non-reciprocal effect, in particular one associated with the phenomenon that the instrument is designed to sense or measure, such as rotation in the plane of the ring laser cavity, or the motion of a medium through which the two counter-circulating traveling waves pass, will cause the individual oscillation frequencies to shift, one to a higher frequency, the other to a lower frequency, with the result that their difference is no longer equal to the bias value, the change from the bias value being a measure of the non-reciprocity that was introduced.

In the preferred embodiment of the present invention establishment of the desired operating condition is facilitated by virtue of the special properties of a ring laser cavity containing an internal saturable absorber. An appropriate configuration is designated schematically as a part of FIG. 1, in which there is disposed a means 1 for providing laser action, said means comprising an active gain medium contained in one or more gain tubes with transparent end windows, together with a means for pumping said active gain medium at a level sufficient to support oscillations. The location within the ring laser cavity of the said gain tube, or tubes, in case there be more than one of them, is arbitrary as far as the purposes of this invention are concerned. The two counter-circulating traveling waves 7 traverse identical geometric paths as defined by three or more cavity reflectors, which may for example be reflecting mirrors or reflecting prisms. In the illustrative embodiment of FIG. 1 these reflectors are shown as the four highly reflecting cavity mirrors 3, 4, 5 and 6. A means 21 is also provided for adjusting the total internal cavity path length. Such means may comprise, for example, a voltage-controlled piezoelectric element mounted on the back side of one of the cavity reflectors.

Figure 1:
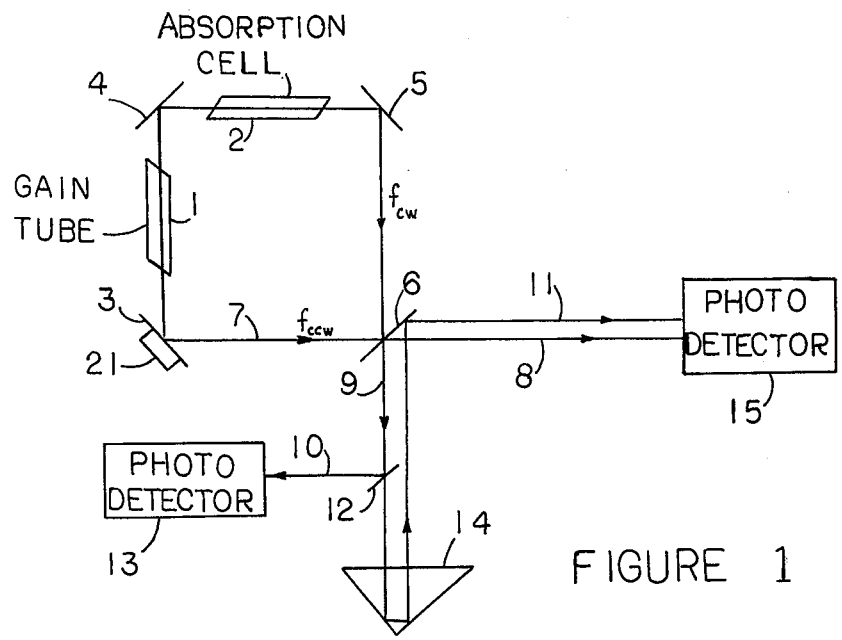
FIG. 1 is a schematic representation of a ring laser having an internal absorption cell, together with auxiliary optical components.

Both traveling waves pass through a cell, or cells, indicated by the numeral 2 in FIG. 1, containing a saturable absorber for which there is an absorption resonance line close to the laser frequency, i.e. very nearly coincident with the resonant frequency of the atoms or molecules comprising the said active gain medium. A number of such coincidences are well known, including especially the methane absorption resonance that coincides with the 3.39 micron line of the He–Ne laser, the absorption resonance in pure, excited neon coinciding with the 0.6328 micron line of the He-Ne laser, and the absorption resonance of $SF_6$ which is coincident with the 10.6 micron line of the $CO_2$ laser, to mention but a few. The number of such absorption cells has no direct bearing on the purposes of this invention and so is in this respect arbitrary. Furthermore, with regard to the present invention, the particular choice of ring geometry, as defined in the illustrative embodiment of FIG. 1 by said reflecting mirrors 3, 4, 5 and 6, is of no significance, and the configuration of a square or rectangle used for illustration in FIG. 1 may as well be replaced by any other ring geometry describable by three or more cavity reflectors. In this regard it is further irrelevant whether the area enclosed by the ring, taken in the vector sense, be zero or non-zero; the former case is of interest for applications such as flow rate monitoring in which it is desired to suppress the rotational sensitivity of the ring laser.

In the biased mode of operation that characterizes this invention in its preferred embodiment a first cavity resonance supports a first unidirectional traveling wave oscillation, and a second and different cavity resonance supports a second traveling wave oscillation that is also unidirectional but with the contrary circulatory propagation sense, the two oscillation frequencies remaining distinct even in the absence of non-reciprocal effects. An oscillation state appropriate to this mode of operation may be achieved if the resonant frequencies of the two said cavity resonances are symmetrically disposed about the center frequency of a predominantly inhomogeneously broadened absorption line. Tuning of the said cavity resonant frequencies is accomplished by virtue of the aforementioned means 21 provided to adjust the total cavity path length. The bias frequency is equal approximately to the difference between the said two individual cavity resonant frequencies. At each of the two distinct oscillation frequencies it is important to ensure that only a single traveling wave oscillation is sustained; this requires, in each case, suppression of the traveling wave mode belonging to the same cavity resonance but having the contrary direction of propagation. Suppression of these undesired traveling wave components is achieved as a concomitant feature of operation through the action of the saturable absorber, whose properties are discussed in further detail below. Not only may a saturable absorber suppress oscillation of the undesired traveling wave components on the said first and second cavity resonances, but under appropriate conditions oscillations on all other cavity resonances may also be suppressed, leaving only the desired traveling wave oscillations on the said first and second cavity resonances.

The required oscillation state may be achieved, for example, by first exciting a unidirectional traveling wave oscillation on a single cavity resonance. Simultaneous oscillation of a second traveling wave mode on a different cavity resonance, said second mode having the contrary circulatory sense of propagation, will then become possible if the two cavity resonant frequencies in question are subsequently tuned so as to satisfy the above stated symmetry condition with respect to the center frequency of the absorption line. Under these circumstances each of the two cavity resonances supports a single unidirectional traveling wave oscillation, the two traveling waves having contrary directions of propagation.

Establishment of the initial state of unidirectional traveling wave oscillation on a single cavity resonance may be achieved, in the case of a homogeneously broaded gain medium, for example, simply by raising the gain to a level sufficient to support oscillation and adjusting the oscillation frequency so that is differs from the center frequency of the inhomogeneously broadened absorption resonance by more than a homogeneous absorption linewidth, approximately. For a gain medium that is inhomogeneously broadened, the said state of unidirectional traveling wave oscillation on a single cavity resonance may again be achieved if, for example, the gain is raised to a level sufficient to support oscillation on a single cavity resonance, said level of gain being insufficient, however, to excite any other cavity resonances, and provided further that the frequency of oscillation on the cavity resonance thereby excited by detuned from the center frequency of the gain resonance by an amount not more than the homogeneous linewidth for the gain resonance, approximately, and provided also the said oscillation frequency differs from the center frequency of the inhomogeneously broadened absorption resonance by an amount greater than the homogeneous linewidth for the absorption resonance, approximately. In normal operation the line centers for gain and absorption will be close to coincident, and the homogeneous linewidth for absorption will be very much less than the homogeneous linewidth for gain, so the tuning condition given for unidirectional generation can easily be satisfied.

Once a state characterized by oscillation of a single unidirectional traveling wave has been established, as for example, by the above prescription, the mode suppression properties of a saturable absorber may be utilized to preserve the said state during the detuning procedure that leads to the satisfaction of the symmetric tuning condition and the resultant establishment of the second coexisting traveling wave having the contrary circulatory propagation sense, as described above.

Referring once again to FIG. 1, the cavity mirror designated by the numeral 6 is partially transmitting so that two output waves may be obtained, one for each of the two counter-circulating traveling waves, which, in the illustrative embodiment of FIG. 1, may be designated as a counter-clockwise beam of frequency $f_{ccw}$, and a clockwise beam of frequency $f_{cw}$; these output waves are indicated, respectively, by the numerals 8 and 9. Means are disposed for rendering the two output beams substantially parallel prior to their incidence on a means 15 for detection of the difference in frequency between the waves 8 and 11. Numerous means exist for rendering one beam parallel to a second; in FIG. 1 such means are illustrated in terms of the reflecting prism 14 and the reflecting mirror 6. The means 15 for detection of the frequency difference between the two output beams may comprise, for example, a photodetector having a square law detection characteristic, for which the output will be an electrical signal containing a frequency component at the difference frequency $f_{cw} - f_{ccw}$. The role of said output signal is further discussed below.

Figure 2:
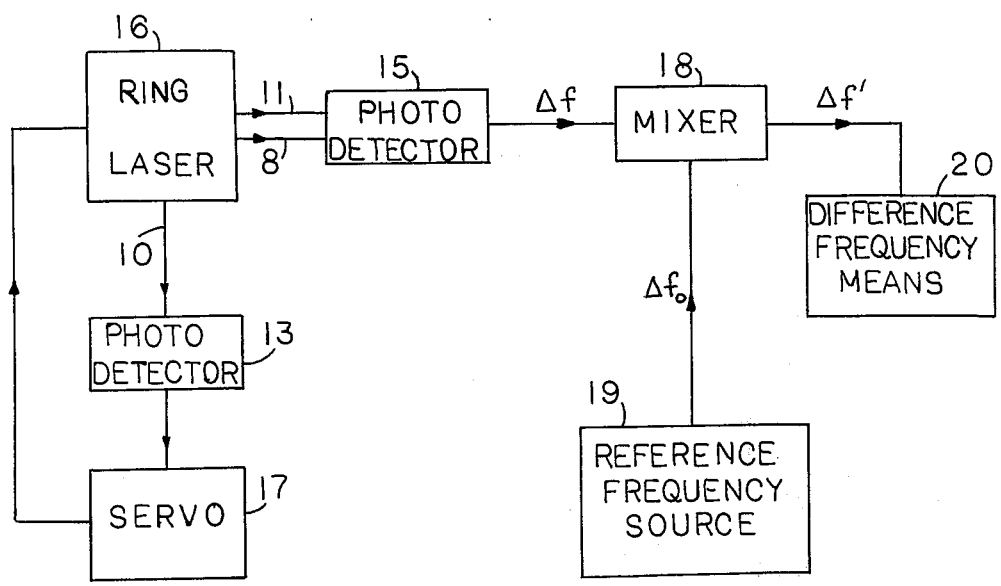
FIG. 2 illustrates in block diagram form a complete ring laser instrument.

As indicated in FIG. 1, a means 12 is disposed for diverting a part of one of the output beams, said means comprising for example a beamsplitter, the diverted beam 10 being incident on an independent means of detection 13 comprising for example a photodetector whose output signal is proportional to the intensity of the incident wave 10. Said intensity will vary with changes in the cavity dimensions, as induced for example by mechanical or thermal instabilities, since the cavity dimensions affect the frequency tuning of the cavity resonances. However, the intensity variations of either output beam will show a stationary behavior as a function of tuning, i.e., a local maximum or minimum, for cavity tuning such that the afore-mentioned symmetry condition for two wave contra-directional generation is satisfied. The linewidth associated with said intensity variations will be comparable, in order of magnitude, with the homogeneous absorption width, which, as mentioned previously, will be very narrow. The manner in which a single output beam intensity varies with cavity tuning provides a basis for stabilization of the cavity dimensions. Stabilization techniques are well known, and in a typical case means for stabilization might comprise a servo whose output signal causes a voltage-controlled piezoelectric element attached to one of the cavity reflectors to adjust appropriate cavity dimensions so as to reduce to zero an error signal that is proportional to the first derivative of the variation of beam intensity with cavity tuning, said error signal being derived by modulating with appropriate amplitude and frequency the voltage applied to said piezoelectric element. The stabilization scheme is represented in block diagram form in FIG. 2, stabilization being achieved by virtue of the loop consisting of the ring laser 16, the means 13 of monitoring the intensity of an output wave 10, and the servo 17.

For an analysis of the physical mechanisms by which the desired operating state is established and sustained, it is necessary first to consider the competition effects that occur when two oscillation modes must compete for gain from the same group of atoms or molecules comprising the gain medium. In such circumstances it may happen that only one of the two modes can be sustained by the said medium. This is the result, for example, in the case of He-Ne ring lasers operating at a wavelength of 0.6328 microns, or a 3.39 microns. Competition effects always occur for a homogeneously broadened gain line, and they may also occur in connection with an inhomogeneously broadened gain line for certain cavity tunings. In particular, in a ring laser where two cavity resonances are tuned symmetrically with respect to the center frequency of an inhomogeneously broadened gain line, there will be competition between a traveling wave oscillation supported by one cavity resonance and the counter-circulating traveling wave oscillation supported by the second cavity resonance. As a result only one of the two said waves will survive, the other being quenched.

If now in the ring laser cavity there is disposed a saturable absorber having a predominantly inhomogeneously broadened resonance line whose center frequency is substantially coincident with the center frequency of the gain line, then the competition effects are of a different nature, and survival of both competing modes may turn out to be the stable oscillation state. Thus, if two resonances of a ring laser cavity are tuned symmetrically about the center frequency of the absorption resonance line, it is then possible to achieve an oscillation state wherein a first cavity resonance supports the oscillation of a first traveling wave and a second cavity resonance supports the oscillation of a second and contradirectional traveling wave, as required in the ring laser operation that characterizes this invention in its preferred embodiment. Behavior of this type is exhibited, for example, if a methane absorber has been disposed in the cavity of a He-Ne ring laser operating at 3.39 microns, or if excited neon is used as the internal saturable absorber in the He-Ne ring laser operating at 0.6328 microns.

This property of a saturable absorber to promote the establishment of the simultaneous oscillations of two counter-circulating traveling waves on two separate cavity resonances is effective over a bandwidth comparable in order of magnitude with the homogeneous absorption width, which, as has been remarked earlier, is typically very narrow. Tuning over the said bandwidth will cause the competition effects associated with the absorber to vary, the effects being maximum when the symmetric tuning condition is precisely satisfied, and tending to vanish if the said condition fails to be satisfied by several homogeneous absorption linewidths. As a consequence the intensities of the individual traveling waves show a local maximum or minimum for symmetric tuning, i.e., there is a stationary point in the intensity vs. tuning curve for each wave. These intensity variations provide a basis for the servostabilization of the cavity dimensions and thus also of the individual oscillation frequencies.

A further feature of the present invention in its preferred embodiment is the suppression of contradirected traveling waves as required to ensure that only a single traveling wave oscillation is supported by each of the two said cavity resonances. Failure to suppress the said contra-directed traveling waves will lead to frequency locking, as described above. Accordingly, it is a further property of the saturable absorber that the desired suppression may be provided as a concomitant feature of operation. The physical mechanism involved here is the selective saturation behavior shown by any inhomogeneously broadened line, whereby a very low, saturated value of absorption may be appropriate to a traveling wave whose oscillation has once been established, but a much higher, unsaturated value may apply to an independent traveling wave whose potential oscillation thereby remains suppressed. The suppression of oscillations on all cavity resonances other than the said first and second cavity resonances is accomplished in the same way.

In addition to the mode competition effects described above, which involve two distinct resonances of a ring laser cavity, there are other competition effects involving only a single cavity resonance that are relevant to the establishment of a single, unidirectional traveling wave oscillation, as described earlier. In particular, for central tuning of a single cavity resonance there is competition for gain between two counter-circulating traveling waves of the same frequency, with the result that only a single traveling wave may survive when the said cavity resonance is tuned to within a homogeneous linewidth, approximately, of the center frequency of the gain line. However, if the said cavity resonance is detuned from line center by several homogeneous linewidths, the competition ceases, and the simultaneous oscillation of both waves becomes possible. Thus, in a ring laser containing no internal saturable absorber, oscillation of a single, unidirectional traveling wave will occur for central tuning of a single cavity resonance. This kind of behavior has been observed and reported, in the case of the 0.6328 micron line of He-Ne, for example, by P. H. Lee and J. G. Atwood in a 1966 article in the IEEE Journal of Quantum Electronics, volume QE-2, page 235, and in the case of the 3.39 micron line, as an additional example, by E. M. Belenov et al. in a 1966 paper that appeared on page 32 of volume 3 of JETP Letters.

The central tuning effects just described are modified if the ring laser cavity contains an internal saturable absorber. In this case tuning to the center of the absorption resonance line may lead to bidirectional generation of two counter-circulating traveling waves of the same frequency. The bandwidth associated with this phenomenon is of the same order of magnitude as the homogeneous absorption width, which is typically smaller by a factor of several hundred than the homogeneous linewidth associated with the gain resonance. Consequently, for oscillation frequencies differing from the center frequency of the absorption line by more than the said bandwidth, the mode competition effects characteristic of the gain medium alone again become operative, and unidirectional generation of a single traveling wave may again be favored. This behavior determines the tuning criteria that have been discussed earlier in connection with the establishment of an initial state of unidirectional traveling wave oscillation on a single cavity resonance. Observation of these effects, as induced by a methane absorber in a He-Ne ring laser operating at 3.39 microns, has been reported in a series of publications by N. G. Basov et al., including two 1970 papers, on page 1079 of volume 30 of Soviet Physics JETP, and on page 101 of volume 12 of JETP Letters, and also in a 1972 article appearing on page 466 of volume 15 of JETP Letters.

With reference once again to FIG. 2, it is to be recalled that since the present invention relates to the operation of a ring laser instrument in a biased mode, the non-reciprocity whose effect is being sensed or measured is indicated quantitatively by the difference in frequency between the two counter-circulating traveling waves relative to the bias value of the said difference in frequency. Therefore, as a part of a complete ring laser instrument means are normally provided to subtract the said bias value from the actual difference in frequency between the two counter-circulating traveling waves. Such means are indicated in block diagram form in FIG. 2. The aforementioned means 15 for detection of the said actual difference in frequency has an input the two output beams 8 and 11, indicated thus also in FIG. 1, and as output an electrical signal of a frequency $\Delta f$ equal to the said actual difference in frequency. The said electrical signal is then applied as one input to a means 18 for obtaining a signal relevant to the difference frequency $\Delta f'$:

$$\Delta f' = \Delta f - \Delta f_0 \quad (3)$$

where $\Delta f_0$ is the frequency of an electrical signal derived from a stable reference frequency source 19 and applied also to the aforesaid means 18, the frequency $\Delta f_0$ and the frequency $\Delta f$ having first been adjusted to be equal in the absence of the input to be sensed or measured; the frequency $\Delta f_0$ is therefore the said bias value of the difference in frequency between the two counter-circulating traveling waves. A possible realization of the means 18 is a frequency mixer providing as output an electrical signal having the said difference frequency $\Delta f'$, said signal being subsequently applied to a means 20 for determining either (a) the value of the said difference frequency $\Delta f'$ or (b) the total number of cycles executed by the said signal. In either case proper account must be taken of the sign of the said difference frequency $\Delta f'$. The said sign establishes a directional orientation for the non-reciprocal effect being sensed; in the case of a rotation sensor, the sign of the frequency difference $\Delta f'$ indicates the sense of the rotation. Determination of the said sign may be made by quadrature phase detection. For a ring laser instrument designed to measure or sense rotation, the said difference frequency $\Delta f'$ indicates the instantaneous rotation rate, while a count of the number of cycles executed by the said signal of frequency $\Delta f'$ provides a measure of net angular displacement.

Another possible realization of the means 18 is a reversible counter, for which the input signal having frequency $\Delta f$ causes counting in one sense (up or down), while the other input signal of frequency $\Delta f_0$ causes counting in the opposite sense. In each case what is counted is the number of cycles executed by the respective signal. The resultant number of counts recorded by the said reversible counter is then the time integral of $\Delta f'$ over an appropriate interval of time. In the case of a ring laser rotation sensor the said resultant number of counts is a measure of the net angular displacement of the ring cavity.

A specific example that will serve to characterize further a possible embodiment of the present invention is the following: a ring laser comprising helium-neon gain cells filled to a pressure of about 5 torr and operating at a wavelength of 3.39 microns, together with internal absorption cells containing methane at a pressure of about 10 millitorr, in a ring cavity in the form of a square 75 centimeters on a side, the ring laser biased mode of operation being based on adjacent axial cavity modes, so that the bias frequency is approximately 100 MHz.

The principle of operating a ring laser in a biased mode utilizing two distinct cavity resonances rather than a single cavity resonance should be recognized as a general one whose realization does not necessarily require an internal saturable absorber. However, the very narrow linewidth characteristic of a low pressure absorptive medium provides the basis for stabilization to a degree unmatched by any other technique in the optical (including UV and IR) region. Numerous other advantages derivable from the action of a saturable absorber have already been recited. Nevertheless, a similar type of ring laser operation is possible with a cavity that does not contain an absorption cell. For example, in a ring laser with no absorption cell, a first cavity resonance may be tuned to the center of an inhomogeneously broadened gain line, where it may support only a single, unidirectional traveling wave oscillation, while a second cavity resonance that is detuned from line center by several homogeneous linewidths may support two independent traveling wave oscillations whose frequencies are of course subject to locking, as discussed earlier. Such a configuration is nevertheless suitable for biased mode operation of a ring laser instrument since the frequency of the oscillation supported by the said first cavity resonance will shift if non-reciprocal effects are introduced. At the same time the oscillation frequency common to the two waves associated with the said second cavity resonance will remain fixed if the locking threshold is not exceeded. Thus, a difference in frequency between two traveling waves may be observed which is responsive to the presence of non-reciprocal effects. It is apparent therefore that the primary object of this invention may be realized without recourse to an internal saturable absorber. However, the corollary objects and advantageous features are best realized in the preferred embodiment, in which the biased mode of operation is promoted through the action of a saturable absorber.

What is claimed is:

1. A method of operating a ring laser in a biased mode, said laser having a gain medium and at least three reflector means defining a single ring cavity, comprising the steps of establishing the oscillation on a first cavity mode of a first traveling wave, establishing the simultaneous oscillation on a second and different cavity mode of the same ring cavity of a second traveling wave differing in frequency from and contra-directional to the first traveling wave, and suppressing contra-directional oscillations of the same frequency as at least one of the first or second traveling waves.

2. The method according to claim 1 further comprising suppressing all other oscillations in said ring laser.

3. Method according to claim 1 wherein said first and second cavity modes are $TEM_{ooq}$ modes whose axial mode numbers $q$ differ by unity.

4. The method according to claim 1 comprising disposing a saturable absorber in said ring cavity, said absorber having a primarily inhomogeneously broadened resonance line, the center frequency thereof being substantially coincident with the center frequency of the resonance line of the gain medium, and tuning said ring cavity so that the mean value of the resonant frequencies of said first and second cavity modes is substantially equal to the center frequency of the resonance line of said saturable absorber.

5. The method according to claim 4 wherein said gain medium comprises helium-neon and said saturable absorber comprises methane, said resonance line occurring at a wave length of 3.39 microns.

6. The method according to claim 4 wherein said gain medium comprises helium-neon and said saturable absorber comprises excited neon, said resonance line occurring at a wave length of 0.6328 microns.

7. The method according to claim 4 comprising the initial steps of raising the gain of said gain medium to a level sufficient to support oscillation on a single cavity resonance and tuning the ring cavity so that the frequency of said cavity resonance differs from the center frequency of the resonance line of the saturable absorber by at least a homogeneous absorption linewidth to establish one of said traveling waves unidirectionally.

8. The method according to claim 7 wherein the ring cavity tuning in the initial steps is within a homogeneous gain linewidth of the center frequency of the resonance line of the gain medium.

9. The method according to claim 4 comprising tuning the ring cavity to a stationary point on the intensity-tuning curve derived from at least one of said traveling waves.

10. The method according to claim 4 additionally comprising stabilizing said ring laser by servo tuning the ring cavity in response to the intensity of at least one of said traveling waves at a stationary point thereof.

11. The method according to claim 1 wherein said gain medium is inhomogeneously broadened and comprising the step of tuning said ring cavity so that the frequency of one of said traveling waves is within a homogeneous linewidth of the center frequency of the resonance line of the gain medium and the frequency of the other of said traveling waves differs from the center frequency by at least a homogeneous linewidth.

12. A method of operating a ring laser in a biased mode comprising establishing the simultaneous oscillation of first and second counter-directed traveling waves of differing frequency on different cavity modes of a single ring cavity and suppressing contra-directional oscillations of the same frequency as at least one of the first or second traveling waves.

13. The method according to claim 12 further comprising suppressing all other oscillations in said ring laser.

14. The method according to claim 12 comprising disposing a saturable absorber in said ring laser, said absorber having a primarily inhomogeneously broadened resonance line, the center frequency thereof being substantially coincident with the center frequency of the resonance line of the laser.

15. The method according to claim 14 comprising tuning said ring laser so that the mean value of the resonant frequencies of said cavity modes is substantially equal to the center frequency of the resonance line of said saturable absorber.

16. The method according to claim 15 wherein said gain medium comprises helium-neon and said saturable absorber comprises methane, said resonance line occurring at a wavelength of 3.39 microns.

17. The method according to claim 15 wherein said gain medium comprises helium-neon and said saturable absorber comprises excited neon, said resonance line occurring at a wavelength of 0.6328 microns.

18. The method according to claim 12 wherein said gain medium is inhomogeneously broadened and comprising the step of tuning said ring cavity so that the frequency of one of said traveling waves is within a homogeneous linewidth of the center frequency of the resonance line of the gain medium and the frequency of the other of said traveling waves differs from the center frequency by at least a homogeneous linewidth.

19. A ring laser operative in a biased mode comprising at least three reflector means defining a single ring cavity, a gain medium for providing laser action disposed in said ring cavity, a saturable absorber disposed in said ring cavity, said absorber having a primarily inhomogeneously broadened resonance line, the center frequency thereof being substantially coincident with the center frequency of the resonance line of the gain medium, and tuning means for varying the path length of said ring cavity so that the mean value of the resonant frequencies of two different cavity modes of said ring cavity is substantially equal to the center frequency of the resonance line of said saturable absorber to establish the simultaneous oscillation of first and second counter-directed traveling waves of differing frequencies on said two different cavity modes of the same ring cavity.

20. Apparatus according to claim 19 wherein said tuning means comprises detector means for detecting the intensity of at least one of said traveling waves and servo means for positioning at least one of said reflectors in response to the detected signal from said detector means at a stationary point thereof.

21. Apparatus according to claim 20 wherein said servo means comprises a voltage controlled piezoelectric element carrying one of said reflectors.

22. Apparatus according to claim 19 wherein said gain medium comprises helium-neon and said saturable absorber comprises methane, said center frequency occurring at a wavelength of 3.39 microns.

23. Apparatus according to claim 19 wherein said gain medium comprises helium-neon and said saturable absorber comprises excited neon, said center frequency occurring at a wavelength of 0.6328 microns.

24. A ring laser operative in a biased mode comprising at least three reflector means defining a single ring cavity, a gain medium for providing laser action disposed in said ring cavity, means for establishing the simultaneous oscillation of first and second counter-directed traveling waves of differing frequencies on different cavity modes of the same ring cavity and means for suppressing counter-directional oscillations of the same frequency as at least one of the first or second traveling waves.

25. Apparatus according to claim 24 wherein said means for establishing and said means for suppressing comprise a saturable absorber disposed in said ring cavity, said absorber having a primarily inhomogeneously broadened resonance line, the center frequency thereof being substantially coincident with the center frequency of the resonance line of the gain medium, and means for tuning said ring cavity so that the mean value of the resonant frequencies of said cavity modes is substantially equal to the center frequency of the resonance line of said saturable absorber.

26. A ring laser operative in a biased mode comprising at least three reflector means defining a single ring cavity, a gain medium for providing laser action disposed in said ring cavity, means for establishing the simultaneous oscillation of first and second counter-directed traveling waves of differing frequencies on different cavity modes of the same ring cavity and means for suppressing all other oscillations in said ring laser.

27. Apparatus according to claim 26 wherein said means for establishing and said means for suppressing comprise a saturable absorber disposed in said ring cavity, said absorber having a primarily inhomogeneously broadened resonance line, the center frequency thereof being substantially coincident with the center frequency of the resonance line of the gain medium, and means for tuning said ring cavity so that the mean value of the resonant frequencies of said cavity modes is substantially equal to the center frequency of the resonance line of said saturable absorber.

28. A method of operating a ring laser in a biased mode, said laser having a gain medium, at least three reflector means defining a single ring cavity, and a saturable absorber disposed in the ring cavity, said absorber having a primarily inhomogeneously broadened resonance line, the center frequency thereof being substantially coincident with the center frequency of the resonance line of the gain medium, comprising tuning the path length of said ring cavity so that the mean value of the resonant frequencies of two different cavity modes of said ring cavity are substantially equal to the center frequency of the resonance line of said saturable absorber to establish the simultaneous oscillation of first and second counter-directed traveling waves of different frequencies on said two different cavity modes of the same ring cavity.

* * * * *